United States Patent [19]

Nakatani et al.

[11] Patent Number: 4,599,184

[45] Date of Patent: Jul. 8, 1986

[54] PROCESS FOR PRODUCING FERROMAGNETIC LIQUID

[75] Inventors: Isao Nakatani, Funabashi; Katashi Masumoto, Tokyo, both of Japan

[73] Assignee: National Research Institute for Metals, Tokyo, Japan

[21] Appl. No.: 696,246

[22] Filed: Jan. 29, 1985

[30] Foreign Application Priority Data

Feb. 1, 1984 [JP] Japan .................................. 59-15281

[51] Int. Cl.[4] ......................... C04B 35/26; B01J 13/00

[52] U.S. Cl. .............................. 252/62.51; 252/62.55; 252/62.56; 252/309; 252/314

[58] Field of Search ................ 252/309, 314, 62.51 R, 252/62.55, 62.56, 62.52

[56] References Cited

U.S. PATENT DOCUMENTS

| | | | |
|---|---|---|---|
| 3,384,589 | 5/1968 | Dunton | 252/62.55 X |
| 3,531,413 | 9/1970 | Rosensweig | 252/309 X |
| 3,764,540 | 10/1973 | Khalafalla et al. | 252/309 X |
| 4,197,347 | 4/1980 | Ogawa et al. | 252/62.55 X |
| 4,356,098 | 10/1982 | Chagnon | 252/309 X |
| 4,416,751 | 11/1983 | Berkowitz et al. | 252/309 X |

*Primary Examiner*—Richard D. Lovering
*Attorney, Agent, or Firm*—Wenderoth, Lind & Ponack

[57] ABSTRACT

A process for producing a ferromagnetic liquid comprising fine particles of a ferromagnetic material and a surface-active liquid, which comprises a step of heating said ferromagnetic material to evaporate it, and a step of bringing the resulting vapor of the ferromagnetic material into contact with the surface-active liquid being stirred.

11 Claims, 4 Drawing Figures

(a)

(b)

(c)

PROCESS FOR PRODUCING FERROMAGNETIC LIQUID

BACKGROUND OF THE INVENTION

1. Field of the Invention

This invention relates to a process for producing a ferromagnetic liquid, and more specifically, to a process for producing a ferromagnetic liquid comprising fine particles of a ferromagnetic material and a surface-active liquid.

2. Description of the Prior Art

Magnetic liquids are liquid state magnets, and their utility in such fields as vacuum rotating shaft seals, ink jet printers and gravity concentration has already been discovered or is being considered. They are also expected to have extensive application to electric wave absorbers, thermal energy converting materials, magnetooptical elements, etc.

Magnetite ($Fe_3O_4$) colloid has been used mainly as such a magnetic liquid. It is produced by (1) a wet pulverizing method which comprises pulverizing a block of magnetite in a colloidal dispersion medium composed of a mixture of water and a surface-active agent in a ball mill for an extended period of time (5 to 20 weeks), and separating large particles to prepare a magnetic liquid; or (2) a wet precipitation method which comprises adding an alkali to a mixed aqueous solution of a ferrous salt and a ferric salt to coprecipitate fine particles of magnetite and thereafter peptizing them to prepare a magnetic liquid. The wet pulverization method (1) is described, for example, in U. S. Patents 3,215,572 to S. S. Papell, 3,917,538 to R. E. Rosensweig 3,764,540 to S. E. Khalafalla and G. W. Rimers, and R. Kaiser and G. Miskolczy, J. Appl. Phys. 41 (1970), 1064, and the wet precipitation method is described, for example, in W. C. Elmore, Phys. Rev. 54 (1938), 309, E. E. Bibik, Kolloidnyi Zh. 35 (1973), 1141, and J. Shimoiizaka, K. Nakatsuka, R. Chubachi and Y. Sato, Nippon Kogyo Kaishi 93 (1977), 83.

Since the wet pulverization method requires a long period of pulverization and a step of separating coarse particles after pulverization, it has a very low production efficiency and the efficiency of utilizing the raw material is poor owing to the separation of coarse particles. Furthermore, because of the theory of this method, the particle diameters of the pulverized particles are distributed over a broad range, and therefore, it is difficult to control the properties of the resulting magnetic liquid and their quality. Another defect is that only soft and brittle materials such as magnetite can be applied to this method as a magnetic material, and the method is difficult to apply to tough and ductile materials such as metals or alloys.

On the other hand, the wet precipitation method utilizes the coprecipitation reaction of iron salts, and is therefore limited to ferromagnetic oxides such as magnetite. It is difficult to apply to a wide range of ferromagnetic materials. Furthermore, the particle diameters of the fine particles obtained by this method are within the range of 100 to 200 Å and uniform within this range, but finer particles are difficult to obtain by this method.

The most important parameter which characterizes the performance of a magnetic liquid is the magnitude of its magnetization. A magnetic liquid obtained by using a magnetite colloid is limited in its performance because the magnetization of magnetite itself is low. The fundamental solution to this problem is to use a colloid composed of fine particles of a ferromagnetic material, for example ferromagnetic metals such as iron and cobalt having high magnetization, ferromagnetic alloys such as an iron-cobalt alloy or an iron-nickel alloy, and ferromagnetic compounds such as Heuster Alloy and Laves phase compounds. Since the ferromagnetic liquids are composed of ferromagnetic particles with a high saturation magnetization, they are liable to agglomerate and lose stability if their particle diameter exceeds 100 Å. Hence, they should have a particle diameter of not more than 100 Å.

As an example of the preparation of a colloid of a ferromagnetic material, J. R. Thomas reported in J. Appl. Phys. 37 (1966), 2914 a method of producing a magnetic liquid composed of a cobalt colloid which comprises thermally decomposing cobalt carbonyl [$Co_2(CO)_8$] in toluene. The cobalt colloidal particles obtained by this method have a particle diameter of about 200 Å and suffer from the defect of being liable to agglomerate in a dense colloid solution.

SUMMARY OF THE INVENTION

It is an object of this invention to provide a novel process for producing a magnetic liquid, which eliminates the defects of the prior art described above.

Another object of this invention is to provide a process for producing a ferromagnetic liquid having high magnetization from various ferromagnetic materials.

Still another object of this invention is to provide a process for producing a ferromagnetic liquid comprising a surface-active liquid and a ferromagnetic metal, a ferromagnetic alloy or a ferromagnetic compound.

Yet another object of this invention is to provide a process for producing a ferromagnetic liquid stable to agglomeration in which fine particles of a ferromagnetic material have a particle diameter of not more than 100 Å.

A further object of this invention is to provide a process for producing a ferromagnetic liquid in which fine particles of a ferromagnetic material have a particle diameter of not more than 100 Å, and the sorting of particles having a narrow particle diameter distribution within this range is not necessary.

A still further object of this invention is to provide a process for producing a ferromagnetic liquid, in which the efficiency of utilizing raw materials is high.

An additional object of this invention is to provide a process for producing a ferromagnetic liquid, which has excellent productivity and can effect continuous production.

According to this invention, there is provided a process for producing a ferromagnetic liquid comprising fine particles of a ferromagnetic material and a surface-active liquid, which comprises a step of heating the ferromagnetic material to evaporate it, and a step of bringing the resulting vapor of the ferromagnetic material into contact with the surface-active liquid being stirred.

According to a preferred embodiment of the above process, the vapor of the ferromagnetic material is brought into contact with the surface active liquid being fluidized, and the resulting surface-active liquid is then stirred.

BRIEF DESCRIPTION OF THE DRAWINGS

FIG. 2-*a* shows the state of the surface of the surface-active liquid before contacting of a vapor of a ferromagnetic material.

FIG. 2-*b* shows the state of the surface of the surface-active liquid during condensation.

FIG. 2-*c* is a schematic view showing the state in which ultrafine particles of the ferromagnetic material are converted to colloids.

DETAILED DESCRIPTION OF THE INVENTION

Figure 1:
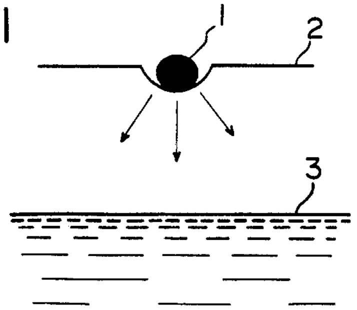
FIG. 1 is a view illustrating the outline of the process for producing a ferromagnetic liquid in accordance with this invention.

One embodiment of the process for producing a ferromagnetic liquid in accordance with this invention is described with reference to FIGS. 1 and 2.

The present inventors have found that when a ferromagnetic material 1 is evaporated by heating it, for example, to 1000° to 2500° C. by a heating device 2 and a surface-active liquid 3 as a medium for a ferromagnetic liquid, namely a mixture of a surface-active agent and a mineral oil having a low vapor pressure, is placed opposite to the heating device 2, the vapor of the ferromagnetic material adheres to the surface-active liquid 3 and condenses to give colloid particles having a particle diameter of as small as 10 to 100 Å with their particle diameters being uniform within this range. This discovery has led to the accomplishment of the present invention.

Figure 2:
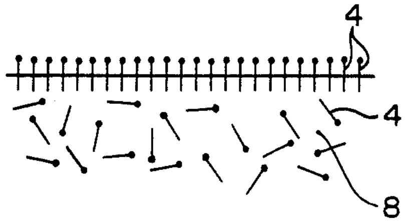
FIG. 2 is a schematic view showing the principle of formation of the magnetic liquid.
Figure 2:
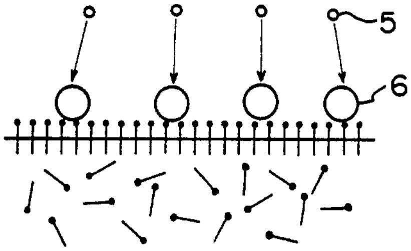
Figure 2:
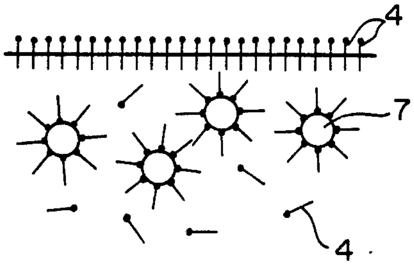

FIG. 2-*a* shows the state of the surface of the surface-active liquid 3 before adhesion of the vapor of the ferromagnetic material. FIG. 2-*b* shows the surface of the surface-active liquid 3 during the evaporation ration of the ferromagnetic material. FIG. 2-*c* is a schematic view showing the state in which ultrafine particles of the ferromagnetic material are covered at their surface with the molecules of the surface-active liquid and taken into the mineral oil to become a stable magnetic colloid, namely a magnetic liquid.

As shown in FIG. 2-*a*, the surface-active agent molecules 4 align while uniformly covering the surface of the mineral oil 8 with their oleophilic groups being directed toward the mineral oil 8 and their adsorptive groups being exposed on its surface. Consequently, the molecules 4 convert the surface of the mineral oil into an active surface having high adsorbability. Then, as shown in FIG. 2-*b*, the vapor 5 of the ferromagnetic material in atomic or molecular form adheres to the surface-active liquid and condenses to form discrete ultrafine particles 6 of the ferromagnetic material having a uniform particle diameter. When the liquid is then stirred, the surfaces of these ultrafine particles are covered with the surface-active agent molecules and taken into the mineral oil to form a magnetic colloid 7. The foregoing process is repeated to form a magnetic liquid of a high concentration.

Preferably, the surface-active liquid is fluidized because by so doing, it can always provide a fresh surface for the vapor of the ferromagnetic material that has reached it. For example, a hollow cylinder whose inside is kept from atmospheric air is provided with its longitudinal axis being kept horizontal and the surface-active liquid is put into its bottom portion. A container including a heating device and a ferromagnetic material is provided at the upper portion of the cylinder. When the cylinder is rotated, a thin film of the surface-active liquid is formed on the inner circumferential surface of the cylinder. When subsequently, the ferromagentic material is evaporated by heating, it adheres to the surface of the film and condenses to form ferromagnetic fine particles. The adhering ferromagnetic fine particles reach the surface-active liquid at the bottom portion of the cylinder by the rotation of the cylinder, undergoes a stirring action there and is finally taken into the surface-active liquid. Thus, the surface of the surface-active liquid is always kept fresh.

The steps of heat evaporating and adhering and condensing the ferromagnetic fine particles may be carried out under vacuum or in an atmosphere of an inert gas such as argon, helium or neon, or an atmosphere filled with nitrogen or oxygen gas. The high vacuum has the advantage that the ferromagnetic material can be easily evaporated and adsorbed to the surface-active liquid and the oxidation of the ferromagnetic material does not occur. The degree of vacuum of the high vacuum is at least $10^{-1}$ mmHg, preferably at least $10^{-2}$ mmHg, more preferably at least $10^{-3}$ mmHg. When the atmosphere is filled with oxygen or nitrogen gas, there can be obtained a magnetic liquid of the ferromagnetic material in the form of an oxide or a nitride, respectively. Preferably, the oxygen gas is filled under a pressure of 200 to $10^{-5}$ mmHg, and the nitrogen gas, under a pressure of 760 mmHg to $10^{-5}$ mmHg. When the oxide or nitride is not desired, the atmosphere may be filled with argon gas or helium gas. The inert gas may be filled under a pressure of not more than 760 mmHg, preferably not more than 100 mmHg.

The fine particles of the ferromagnetic material included in the surface-active liquid have a particle diameter of 10 to 100 Å, preferably 20 to 100 Å. If the particle diameter exceeds 100 Å, the ferromagnetic liquids are liable to agglomerate and lack stability. If it is less than 10 Å, the particles undesirably lose magnetization. Preferably, the fine particles of the ferromagnetic material have as narrow a particle size distribution as possible within the range of 10 to 100 Å. One advantage of this invention is that fine particles of the ferromagnetic material can be obtained, and by properly selecting the surface active agent, a ferromagnetic liquid having a desired particle diameter can be obtained.

The amount of the surface-active agent in the surface-active liquid is 0.1 to 30% by weight, preferably 1 to 20% by weight. The surface-active agent desirably has a saturation or dissociation vapor pressure of not more than 10 mmHg at 50° C., preferably 200° C. Furthermore, the surface-active agent used in this invention is preferably soluble in the liquid having a low vapor pressure in the surface-active liquid has a lower surface tension than it, and possesses a functional group which shows strong adsorbability to the ferromagnetic material. Examples of the surface-active agent include anion surface-active agents such as sulfuric acid ester salts, sulfonic acid ester salts, carboxylic acid salts and phosphoric acid ester salts, cationic surface-active agents of the amine salt type, amphoteric surface-active agents of the amino acid type or the betaine type, amides, imides, metal phenates, and poly(methacrylate) having a polar group, and their mixtures. These are not particularly limitative, and any compounds which satisfy the aforesaid properties can be used in this invention.

The liquid having a low vapor pressure in the surface-active liquid desirably has a saturation or dissociation vapor pressure of not more than $10^{-1}$ mmHg at 50° C., preferably at 200° C. If the vapor pressure exceeds $10^{-1}$ mmHg, the molecules of the low vapor pressure liquid scatter in the atmosphere and collide with the vapor of the atomic or molecular ferromagnetic material to hamper the adsorption of the ferromagnetic material to the surface-active liquid.

Examples of the low vapor pressure liquid are hydrocarbons having a low vapor pressure such as alkylnaphthalenes, alkyl diphenyl ethers, polyphenyl ether, diesters, silicone oils, fluorocarbon oils, and mixtures of these. These are not limitative, and any liquids having a low vapor pressure may be used.

Examples of the ferromagnetic material used in the process of this invention are ferromagnetic metal elements such as iron, cobalt, nickel and rare earth elements, ferromagnetic or ferrimagnetic alloys or compounds containing at least one of such metal elements as a component, and ferromagnetic compouds or alloys containing at least one of manganese, chromium and vanadium as a component. Any metals, alloys and compounds having ferromagnetism may be used.

The heating device for heating the ferromagnetic material used in this invention may, for example, be a resistance heating device, an electron bombarding heating device, an electromagnetic induction heating device or a laser or infrared ray heating device. However, it is not particularly limited to these specific devices.

If the temperature of the surface-active liquid is elevated to an undesirable point by the thermal energy generated from the heating device, it can be maintained at the desired temperature by cooling the device used in the practice of this invention by methods well known to those skilled in the art.

The process of this invention brings about various excellent advantages not obtainable by the prior art, among which are:

(1) Since the ferromagnetic liquid in accordance with this invention is provided by adhering a vapor of the ferromagnetic material to the surface-active liquid and condensing it, it is possible to produce magnetic liquids of not only magnetite and cobalt use in the prior art but also other ferromagnetic metals, ferromagnetic alloys and ferromagnetic compounds. Accordingly, the process of this invention can give magnetic liquids having a saturation magnetization of 1500 gauss not obtainable by the prior art. Magnetic liquids having excellent thermal and electrical conductivity can also be produced.

(2) By varying the atmosphere, a magnetic liquid of a ferromagnetic metal nitride or a ferromagnetic metal oxide may also be produced. For example, when the process of this invention is carried out in an atmosphere containing a suitable amount of oxygen, not only a magnetic liquid of a magnetite colloid of the conventional type but also a magnetic liquid of a multielement ferrite colloid can be produced.

(3) Since the colloidal particles have a particle diameter of 10 to 100 Å, the resulting magnetic liquid has resistance to agglomeration or precipitation and shows high stability. Furthermore, because the particle diameters are uniform, it is not necessary to sort out particles of the desired size. The manufacturing steps are therefore simplified, the yields are high, and the production efficiency is excellent.

(4) The desired magnetic liquid can be continuously produced, and automation of the manufacturing process and quality control are easy. Hence, the process of this invention is suitable for industrial production.

EXAMPLE 1

Iron colloid magnetic liquid

A solution of alkylpropylene diamine in alkylnaphthalene in a concentration of 10% was used as a surface-active liquid.

As a heating device, an alumina crucible was put in a helically wound tungsten resistance wire, and electrolytic iron was filled in the crucible. The crucible was then set in a vacuum receptacle.

While the surface-active liquid was fluidized, iron in the crucible was heated to 1800° to 2000° C. under a vacuum of at least $10^{-4}$ mmHg to evaporate it. The vapor was allowed to adhere to the surface-active liquid and condensed. When the above operation was performed for about 10 minutes using 10 g of the electrolytic iron, a magnetic liquid composed of fine iron particles with an average diameter of 20 Å and having a magnetization of about 100 gauss/cc was obtained. By increasing the amount of the electrolytic iron and repeating the foregoing operation, a ferromagnetic liquid having a magnetization of as high as 1200 gauss/cc could be produced.

EXAMPLE 2

Iron-cobalt alloy colloid magnetic liquid

An iron-cobalt alloy colloid magnetic liquid composed of fine particles of iron-cobalt alloy with an average particle diameter of 20 Å and having a magnetization of about 150 gauss/cc was obtained by the same method as in Example 1 except that 50% iron-cobalt alloy was used instead of the electrolytic iron. By repeating the foregoing operation, a magnetic liquid having a magnetization of as high as 1500 gauss/cc could be produced.

EXAMPLE 3

Iron nitride colloid magnetic liquid

An iron nitride magnetic liquid composed of fine particles of iron nitride colloidal particles with a particle diameter of about 20 Å and having a magnetization of about 200 gauss/cc was obtained by the same method as in Example 1 except that instead of employing the vacuum condition of Example 1, the vacuum receptacle was evacuated by a vacuum pump while introducing high-purity nitrogen gas into it, and thus the pressure of nitrogen gas was maintained at about 1 mmHg. During the above operation, the outside wall of the vacuum receptacle was cooled with water.

By repeating the foregoing operation, a magnetic liquid having a magnetization of 1200 gauss/cc could be produced.

What is claimed is:

1. A process for producing a ferromagnetic liquid comprising fine particles of a ferromagnetic material having a particle diameter of 10–100 Å and a surface-active liquid, wherein a step of heating said ferromagnetic material to evaporate it and a step of bringing the resulting vapor of the ferromagnetic material obtained from said heating and evaporating step into contact with the surface-active liquid being stirred are carried out substantially simultaneously in one and the same vessel, the surface-active agent of the surface-active liquid having a saturation or dissociation vapor pressure of not more than $10^{-1}$ mmHg at 50°–200° C., and the liquid of the surface-active liquid having a saturation or dissociation vapor pressure of not more than $10^{-1}$ mmHg at 50° C.

2. The process of claim 1 wherein the resulting vapor of the ferromagnetic material is brought into contact with the surface-active liquid being fluidized, and thereafter, the surface-active liquid is stirred.

3. The process of claim 1 wherein both the evaporating step and the contacting step are carried out in an atmosphere kept at a pressure of not more than $10^{-1}$ mmHg.

4. The process of claim 1 wherein both the evaporating step and the contacting step are carried out in the presence of an inert gas under a gaseous pressure of not more than 760 mmHg.

5. The process of claim 4 wherein the inert gas is at least one gas selected from the group consisting of helium, neon and argon.

6. The process of claim 1 wherein both the evaporating step and the contacting step are carried out in the presence of a nitrogen gas under a gaseous pressure of 760 mmHg to $10^{-5}$ mmHg.

7. The process of claim 1 wherein both the evaporating step and the contacting step are carried out in the presence of oxygen gas under a gaseous pressure of 200 to $10^{-5}$ mmHg.

8. The process of claim 1 wherein the ferromagnetic material is a ferromagnetic metal, a ferromagnetic alloy or a ferromagnetic compound.

9. The process of claim 8 wherein the ferromagnetic metal is at least one metal selected from the group consisting of iron, cobalt, nickel and rare earth elements.

10. The process of claim 8 wherein the ferromagnetic alloy and the ferromagnetic compound contains as constituent elements at least one metal element selected from the group consisting of iron, cobalt, nickel and rare earth elements and/or at least one element selected from the group consisting of manganese, chromium and vanadium.

11. The process of claim 1 wherein the surface-active liquid contains 0.1 to 30% by weight of the surface-active agent.

* * * * *